United States Patent [19]
Han

[11] Patent Number: 5,133,425
[45] Date of Patent: Jul. 28, 1992

[54] PASSIVE SEAT BELT SYSTEM

[76] Inventor: Chong K. Han, 212 Nowon-Dong, Buk-Ku, Daegu, Rep. of Korea

[21] Appl. No.: 619,465

[22] Filed: Nov. 29, 1990

[51] Int. Cl.⁵ ................................................ B60R 21/00
[52] U.S. Cl. .................................. 180/270; 280/802; 24/196; 200/61.58 B
[58] Field of Search ............... 280/801, 802; 180/270; 24/196, 197, 171, 639, 642; 200/61.58 B, 61.58 R

[56] References Cited

U.S. PATENT DOCUMENTS

| | | | |
|---|---|---|---|
| 3,449,714 | 6/1969 | Farley, Jr. | 280/801 |
| 3,619,633 | 11/1971 | Brandon | 180/287 |
| 3,718,902 | 2/1973 | Pearsall | 180/270 |
| 3,934,671 | 1/1976 | Hart | 200/61.58 B |
| 3,955,056 | 5/1976 | Lindblad | 200/61.58 B |
| 4,107,645 | 8/1978 | Lewis et al. | 180/270 |
| 4,189,170 | 2/1980 | Tanaka | 280/802 |
| 4,313,519 | 2/1982 | Lipschutz | 180/270 |
| 4,673,195 | 6/1987 | Boyd et al. | 280/801 |
| 4,785,906 | 11/1988 | Kang | 180/270 |

FOREIGN PATENT DOCUMENTS 1378745 12/1974 United Kingdom ............... 280/801

*Primary Examiner*—Mitchell J. Hill
*Assistant Examiner*—Paul Dickson

[57] ABSTRACT

A passive seat belt system includes a seat belt buckle of a receptacle device having a connecting switch member connected to a battery of a vehicle and a tongue of a webbing so that the vehicle can be actuated or not in response to fastening or unfastening of a seat occupant.

3 Claims, 3 Drawing Sheets

PASSIVE SEAT BELT SYSTEM

BACKGROUND OF THE INVENTION

1. Field of the Invention

The present invention relates to a passive seat belt system for automatic actuating or deactivating of a vehicle in response to fastening or unfastening of a seat occupant through a seat belt so as to prevent from causing a traffic accident and induce to build up a habit for fastening a seat belt. And more particularly, the present invention relates to an improved passive seat belt system which includes a seat belt buckle device having a connecting switch member connected to an electric source of a vehicle, and a tongue of an occupant retraining webbing or lap belt so that when a seat occupant seated in a seat of the vehicle engages the tongue with the seat belt buckle device, the vehicle can be actuated such as igniting and driving of the vehicle.

2. Description of the Prior Art

Even though occupant restraining seat belt systems for vehicles have been developed, most of seat occupants are not used to fasten the seat belt. Accordingly, in the most recent, the state law for forcing to fasten the seat belt has come to effect. However, it is a big problem that the seat occupants have never built up a habit for fastening the seat belt.

SUMMARY OF THE INVENTION

Accordingly, it is an object of the present invention to provide a passive seat belt system so as to induce to build up a habit to fasten the seat belt.

Another object of the present invention is to provide an improved passive seat belt system which includes a seat belt buckle device having a connecting switch member connected to a battery of a vehicle, and a tongue of an occupant retraining webbing or lap belt so that when a seat occupant seated in a seat of the vehicle engages the tongue with the seat belt buckle device, the vehicle can be actuated such as igniting and driving of the vehicle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a passive seat belt system includes a seat belt buckle of a receptacle device having a connecting switch member connected to a battery of a vehicle and a tongue of a webbing so that the vehicle can be actuated or not in response to fastening or unfastening of a seat occupant.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
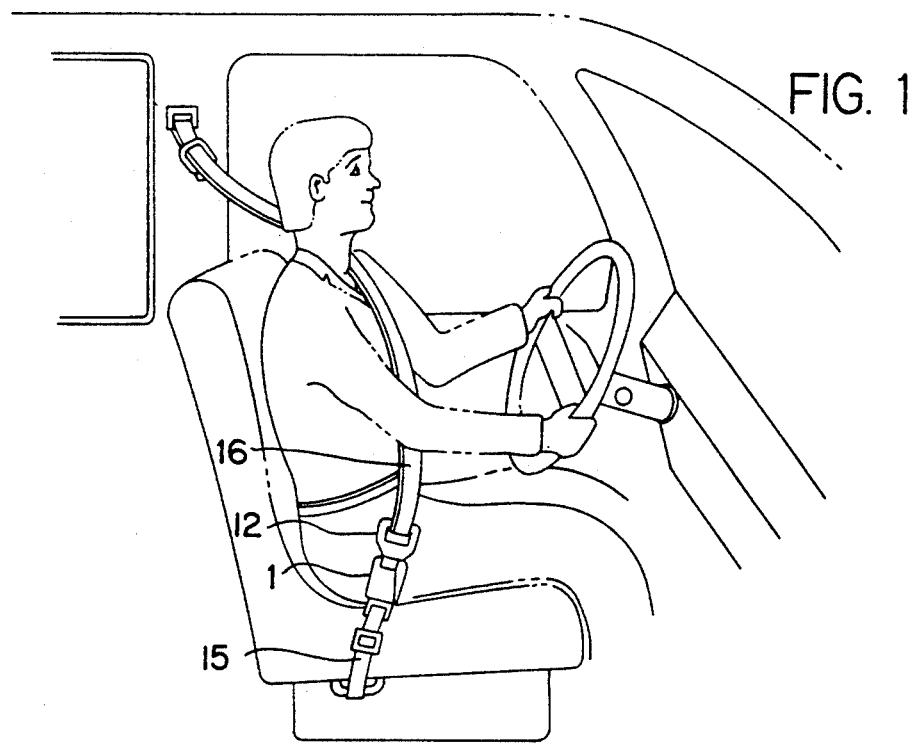
FIG. 1 is a perspective view of the passive seat belt system applied to a seat occupant according to the present invention.
Figure 2:
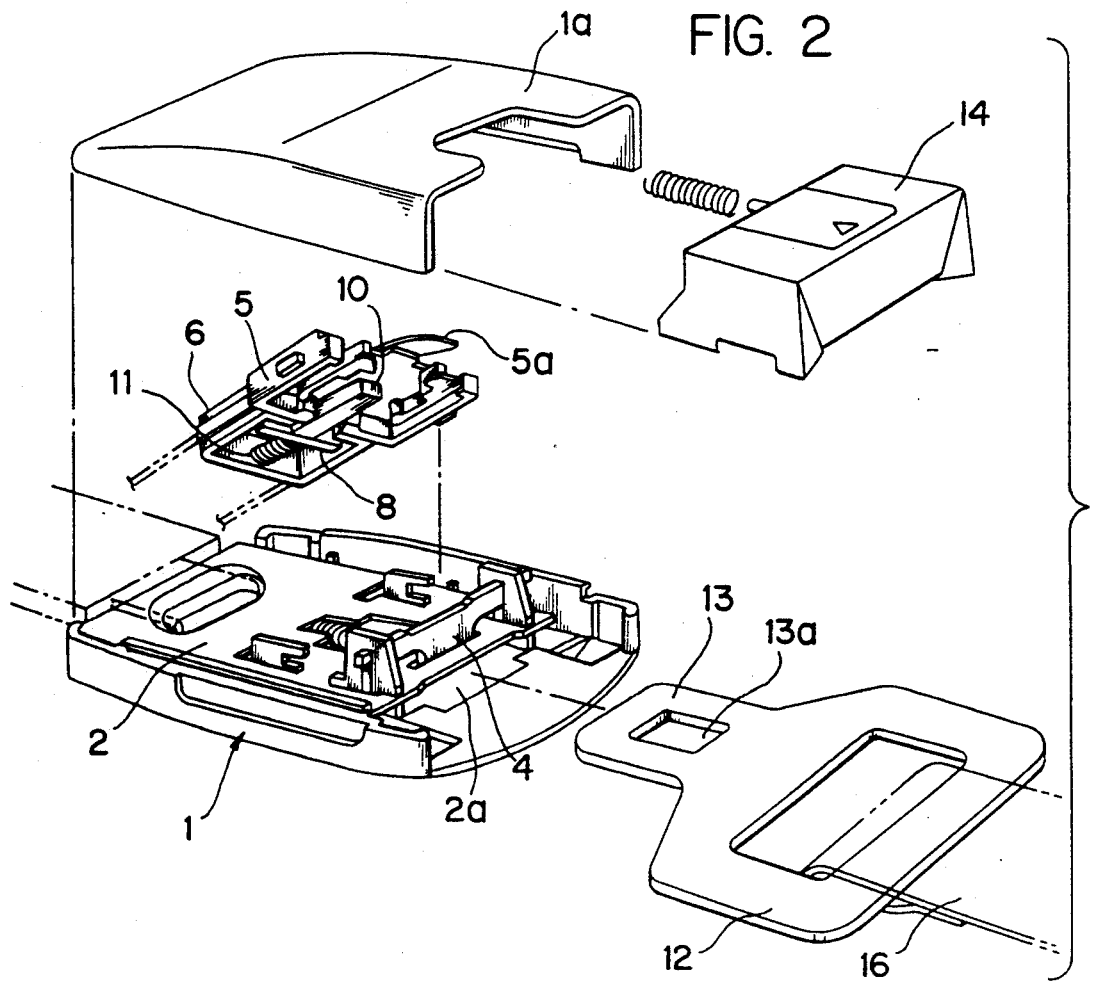
FIG. 2 is an exploded perspective view of a seat belt buckle device according to the present invention.
Figure 3:
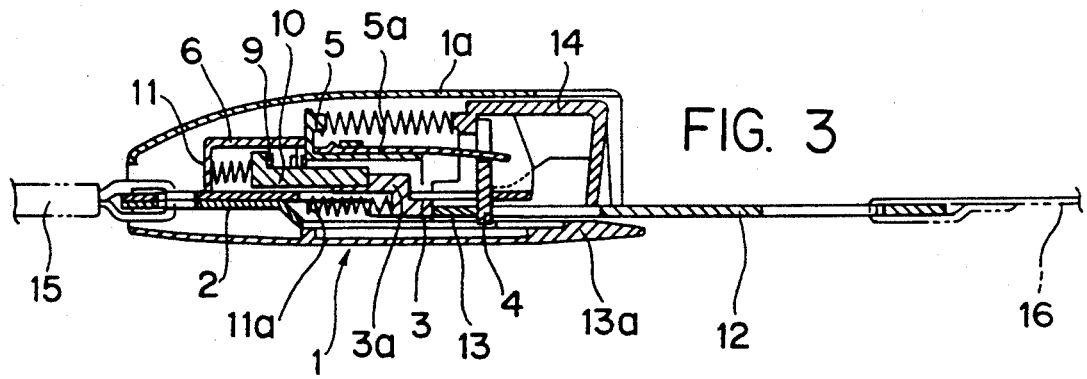
FIG. 3 is a sectional view of an engagement state of the seat belt buckle device and a tongue of a restraining webbing or lap belt.

Referring now in detail to the drawings for the purpose of illustrating preferred embodiments of the present invention, the passive seat belt system shown in FIGS. 1, 2, 3, and 4, comprises a seat belt buckle device 1 rigidly secured to a receptacle or fixed belt 15 and a tongue 12 which is fitted on an occupant restraining webbing or lap belt 16 for being adapted to be engaged with the seat belt buckle device 1.

The seat belt buckle device 1 includes a basic casing 2 and a cover 1a. The basic casing 2 contains a tongue inserting hole 2a for slidably receiving a tip 13 of the tongue 12 of the restraining webbing 16 so as to press a moving member 3 so that a latch 4 is engaged with an engagement aperture 13a of the tongue 12. When a pressing plate 5a supported on the basic casing 2 is pressed by a release button 14, the tongue 12 is easily released from the buckle device 1 of the fixed belt 15.

Figure 4:
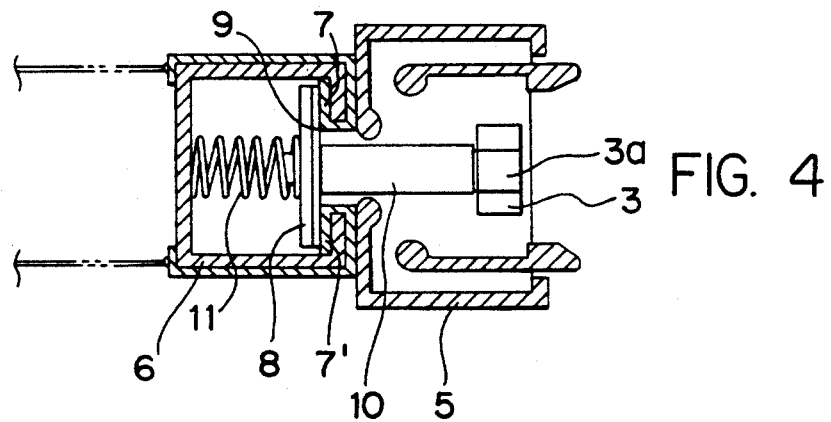
FIG. 4 is an enlarged sectional view of essential components of FIG. 3.
Figure 5:
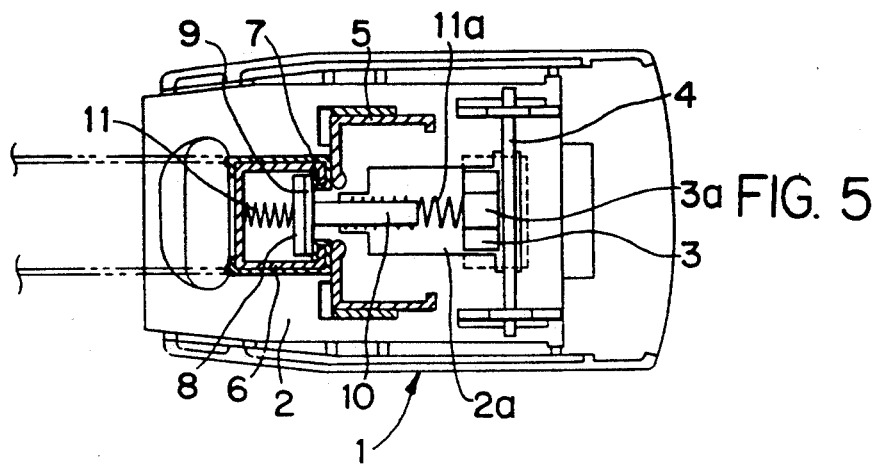
FIG. 5 is an enlarged sectional view of a connecting switch member according to the present invention.
Figure 6:
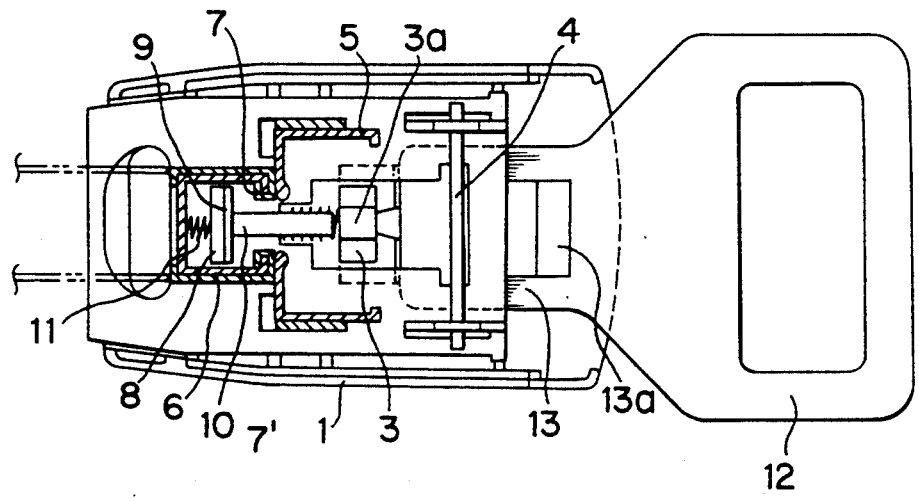
FIG. 6 is a cross-sectional view of FIG. 3.

As shown in FIGS. 4, 5, and 6, the moving member 3 disposed in a pair of supports 5 contains a raised portion 3a extending from the top portion thereof. The pair of supports 5 disposed under the cover 1a are provided with a connecting switch box 6 which contains a pair of conducting terminals 7 and 7', an attaching plate 8 having a first resilient spring 11 biased from the wall of the connecting switch box 6, and a contacting terminal 9 tightly attached to the attaching plate 8. A movable operating rod 10 attached to the attaching plate 8 is slidably moved forward and backward by pushing of the raised portion 3a of the moving member 3 and biasing of the first resilient spring 11. At this time, the moving member 3 is connected to a second resilient spring 11a fixed to the basic casing 2 (FIG. 5). Also, by moving the operating rod 10, the contacting terminal 9 can be separated from the pair of conducting terminals 7 and 7' (FIG. 6).

Figure 7:
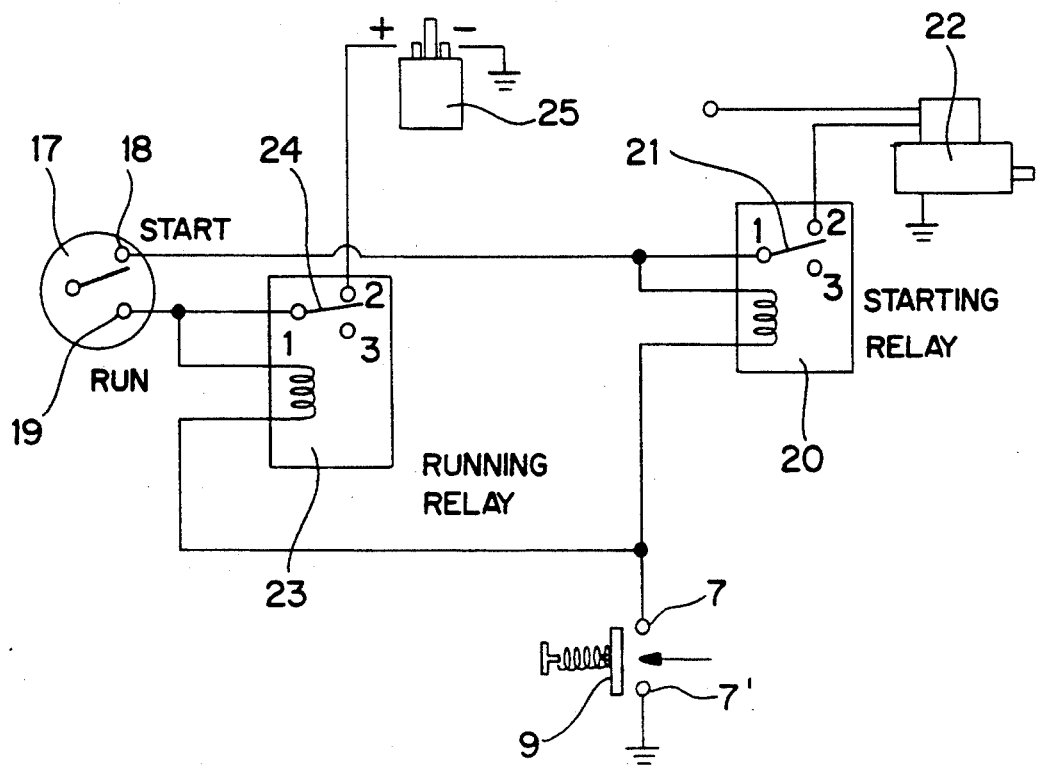
FIG. 7 is a circuit diagram showing a basic construction according to the present invention.

As shown in FIG. 7, a starting terminal 18 disposed in a key box 17 is connected to an engine 22 of a vehicle and the pair of conducting terminals 7 and 7' through a starting relay 20 and a first connecting switch 21. A driving terminal 19 disposed in the key box 17 is connected to a battery 25 of the vehicle and the pair of conducting terminal 7 and 7' through a running relay 23 and a second connecting switch 24.

The passive belt system of the present invention operates as follows.

When the seat occupant does not engage the tongue 13 of the restraining webbing 16 with the seat belt buckle device 1 of the fixed belt 15, the driver cannot ignite the engine 22 of the vehicle. Since the pair of conducting terminals 7 and 7' are contacted to the contacting terminal 9 of the attaching plate 8 by biasing the first resilient spring 11, the electricity can actuate to them. At this time, when a vehicle key is actuated to start the ignition, the electricity actuates to operate the starting relay 20. Therefore, the starting relay 20 is actuated to function as a magnet which closes the second connecting switch 24 for connecting a terminal No. 1 to a terminal No. 3 from the terminal No. 2 of the first connecting switch 21 so that since the engine 22 is deactivated, the vehicle does not ignite (FIG. 4).

On the contrary, when the seat occupant fastens the seat belts 15 and 16, that is, the tip 13 of the tongue 12 is inserted into the tongue inserting hole 2a of the seat belt buckle device 1. At this time, the tip 13 simultaneously presses the raised portion 3a of the moving member 3 and continuously presses the movable operating rod 10 so as to move it backward. Therefore, the contacting terminal 9 of the attached plate 8 is separated from the pair of conducting terminals 7 and 7′, and the starting relay 20 does not complete the circuit with the battery 25 of the vehicle so that the terminal No. 1 is released from the terminal No. 3 of the first connecting switch 21 and the terminal No. 1 is connected to the terminal No. 2 of the first connecting switch 21. Accordingly, the engine 22 of the vehicle is ignited (FIGS. 6 and 7).

Thereafter, when the key in the key box 17 is laid on the running state, the pair of conducting terminals 7 and 7′ do not complete the circuit with the battery 25 of the vehicle so that since the driving relay 23 is deactivated, a terminal No. 1 and a terminal No. 2 of the second connecting switch 24 are completed the circuit with the battery 25 and the vehicle can be continuously driven.

When the belts are unfastened during driving of the vehicle, the contacting terminal 9 separated from the conducting terminals 7 and 7′ is recontacted to the conducting terminals 7 and 7′. At that time, the running relay 23 is actuated and the starting relay 20 is actuated to function as a magnet which closes the second connecting switch 24 so that the terminal No. 1 is connected to the terminal No. 3 from the terminal No. 2 of the second connecting switch 24. Accordingly, the running terminal 19 does not complete the circuit with the battery 25 so that the vehicle is stopped.

Accordingly, the passive seat belt system according to the present invention uses for automatic actuating and deactivating of a vehicle in response to fastening and unfastening of seat occupant through a seat belt so as to prevent from causing a traffic accident and induce to build up a habit for fastening a seat belt.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A passive seat belt system including a seat belt buckle device of a fixed belt and a tongue of a restraining webbing for being adapted to be engaged with the seat belt buckle device, said passive seat belt system comprising:
   a housing defining said seat belt buckle device, said housing including:
   a tongue inserting hole for slidably receiving a tip of said tongue,
   a pressing plate for engaging said tongue with or releasing said tongue from an engagement aperture,
   a moving member having a raised portion extending from the top portion of said moving member,
   a movable operating rod operatively connected to said moving member for movement to a first position and to a second position,
   a first resilient spring operatively connected to an attaching plate and a contacting terminal and the movable operating rod,
   a second resilient spring operatively connected to the raised portion and the movable operating rod,
   a connecting switch box containing said attaching plate, said first resilient spring connected to said connecting switch box and one side of said attaching plate, said contacting terminal attached to the other side of said attaching plate for fixing to said movable operating rod, and a pair of conducting terminals attached to the interior of said connecting switch box for operatively associating with said contacting terminal,
   a key box including a starting terminal and a driving terminal for receiving a vehicle key,
   a starting relay operatively connected to the key box, including a first connecting switch and connected to an engine of a vehicle, and
   a running relay including a second connecting switch and connected to said driving terminal and a battery, so that when said operating rod is in said first position said contacting terminal connects to said pair of conducting terminals the vehicle cannot be started and when said operating rod is in said second position said contacting terminal is disengaged from said pair of conducting terminals the vehicle can be started.

2. The passive seat belt system of claim 1, wherein the first connecting switch contains two terminals so as to connect to the engine of the vehicle for its ignition when the seat occupant fastens the seat belt or disconnect to the engine of the vehicle for its deactivation when the seat occupant unfastens the seat belt.

3. The passive seat belt system of claim 1, wherein the second connecting switch contains two terminals so as to connect to the battery for driving the vehicle when the seat occupant fastens the seat belt or disconnect to the battery for stopping the vehicle when the seat occupant unfastens the seat belt.

* * * * *